US009155014B2

(12) United States Patent
Tenny et al.

(10) Patent No.: US 9,155,014 B2
(45) Date of Patent: Oct. 6, 2015

(54) CONDITIONAL ACCESS TERMINAL INITIATION OF DELAYED HANDOVER

(75) Inventors: Nathan E. Tenny, Poway, CA (US); Parag A. Agashe, San Diego, CA (US); Rajat Prakash, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 531 days.

(21) Appl. No.: 12/618,142

(22) Filed: Nov. 13, 2009

(65) Prior Publication Data

US 2010/0124203 A1 May 20, 2010

Related U.S. Application Data

(60) Provisional application No. 61/115,404, filed on Nov. 17, 2008, provisional application No. 61/117,848, filed on Nov. 25, 2008.

(51) Int. Cl.
*H04W 36/24* (2009.01)
*H04W 24/08* (2009.01)

(52) U.S. Cl.
CPC .............. *H04W 36/24* (2013.01); *H04W 24/08* (2013.01)

(58) Field of Classification Search
CPC ............ H04W 36/00; H04W 36/0005; H04W 36/0016; H04W 36/08; H04W 36/10; H04W 36/14; H04W 36/16; H04W 36/165; H04W 36/18; H04W 36/20; H04W 36/22; H04W 36/24; H04W 36/245; H04W 36/26; H04W 36/28; H04W 36/30; H04W 36/34; H04W 36/36; H04W 36/38; H04W 36/385
USPC ........................... 370/331–338; 455/436–444
See application file for complete search history.

(56) References Cited

U.S. PATENT DOCUMENTS 6,507,740 B2   1/2003   Shi
6,778,830 B1   8/2004   Oizumi et al.
(Continued)

FOREIGN PATENT DOCUMENTS

CN              1949919 A      4/2007
GB      WO 2008/023204 A1 *  2/2008   ............... H04Q 7/38
(Continued)

OTHER PUBLICATIONS

Alcatel-Lucent: "Intra-frequency measurement reporting events," Discussion & decision 3GPP Draft; R2-074962; Jeju; Korea, (Nov. 5-9, 2007), XP050137453 [retrieved on Nov. 12, 2007] p. 1, paragraph 2.
(Continued)

*Primary Examiner* — Habte Mered

(57) ABSTRACT

The number of handover-related failures that occur in a communication system may be reduced by taking target access point conditions into account when declaring radio link failure and/or by delaying certain handover operations. In some aspects, criteria for radio link failure detection and access terminal-controlled mobility may take into account access point parameters related to neighboring cells that may be available as mobility targets. For example, filtering mechanisms for detecting radio link failure based on radio layer problem reports may also take into account the availability of various neighbor access points and their measured signal strengths. In addition, a handover command may be sent earlier than in conventional systems (e.g., the handover command may be sent even though the target access point is weaker than the source access point) and include an indication that instructs the access terminal to delay handover until a specified condition is met. For example, handover may be delayed until the target access point becomes stronger than the source access point.

43 Claims, 9 Drawing Sheets

(56) References Cited

U.S. PATENT DOCUMENTS

| | | | |
|---|---|---|---|
| 8,099,097 B2* | 1/2012 | Miyata | 455/438 |
| 2002/0032034 A1 | 3/2002 | Tiedemann et al. | |
| 2002/0061749 A1* | 5/2002 | Hunzinger | 455/436 |
| 2002/0068571 A1 | 6/2002 | Ohlsson et al. | |
| 2005/0181795 A1 | 8/2005 | Mark et al. | |
| 2006/0084438 A1 | 4/2006 | Kwon | |
| 2007/0140185 A1 | 6/2007 | Garg et al. | |
| 2007/0191013 A1 | 8/2007 | Gunnarsson et al. | |
| 2008/0014943 A1 | 1/2008 | Ahn et al. | |
| 2008/0089292 A1 | 4/2008 | Kitazoe et al. | |
| 2008/0261600 A1 | 10/2008 | Somasundaram et al. | |
| 2008/0267127 A1 | 10/2008 | Narasimha et al. | |
| 2008/0268844 A1* | 10/2008 | Ma et al. | 455/436 |
| 2009/0061878 A1 | 3/2009 | Fischer | |
| 2009/0092078 A1 | 4/2009 | Czaja et al. | |
| 2009/0137250 A1 | 5/2009 | Kurimoto et al. | |
| 2010/0029276 A1* | 2/2010 | Hwang | 455/436 |
| 2010/0124172 A1 | 5/2010 | Tenny et al. | |
| 2010/0197308 A1* | 8/2010 | Racz et al. | 455/436 |
| 2011/0080825 A1* | 4/2011 | Dimou et al. | 370/216 |

FOREIGN PATENT DOCUMENTS

| | | |
|---|---|---|
| GB | 2445398 A | 7/2008 |
| JP | 2001128209 A | 5/2001 |
| JP | 2004166203 A | 6/2004 |
| JP | 2007243758 A | 9/2007 |
| JP | 2007535205 A | 11/2007 |
| JP | 2008053889 A | 3/2008 |
| JP | 2008539606 A | 11/2008 |
| WO | 2005025091 A1 | 3/2005 |
| WO | WO-2006086359 A2 | 8/2006 |
| WO | 2006131977 A1 | 12/2006 |
| WO | 2007127950 A1 | 11/2007 |
| WO | WO 2007130324 | 11/2007 |
| WO | WO 2008023204 | 2/2008 |
| WO | 2008041802 A1 | 4/2008 |
| WO | WO 2008086460 | 7/2008 |
| WO | 2008131401 A1 | 10/2008 |
| WO | 2008133579 A1 | 11/2008 |

OTHER PUBLICATIONS

Huawei: "Solutions for the Mobility Robustness use case" 3GPP Draft; R3-081165, Kansas City, USA; (May 5, 2008), XP050164358, p. 2, paragraph 2 and paragraph 3.1 to p. 5, paragraph 6.

International Search Report & Written Opinion—PCT/US2009/064644, International Search Authority—European Patent Office—Mar. 10, 2010.

International Search Report & Written Opinion—PCT/US2009/064646, International Search Authority—European Patent Office—Mar. 3, 2010.

Qualcomm Europe: "Mobility enhancements" 3GPP Draft; R1-083819, Prague, Czech Republic; (Sep. 29, 2008), XP050317143, p. 1, paragraph 2.1—p. 2, paragraph 2.3

T-Mobile: "Information to be included at Hand Over request messages, to avoid Ping-Pong Hand Over," 3GPP Draft; R3-071598, Athens, Greece; (Aug. 20, 2007).

ZTE: "Some signaling aspect of intra-LTE handover procedure," 3GPP Draft; R2-070486; St. Louis, USA; (Feb. 9, 2007), XP050133549, p. 1, paragraph 2.1 and pp. 3-5.

Mitts H., et al., "Lossless handover for wireless ATM", Mobile Networks and Applications, 1996, vol. 1, Issue 3, pp. 299 to 312.

Taiwan Search Report—TW098139038—TIPO—Apr. 10, 2013.

Taiwan Search Report—TW098139029—TIPO—Nov. 14, 2013.

Rapporteur (Samsung): "Miscellaneous corrections and clarifications" 3GPP Draft; R2-085978 CR to 36331-830-VER2, 3rd Generation Partnership Project (3GPP), Mobile Competence Centre; 650, Route Des Lucioles; F-06921 Sophia-Antipolis Cedex ; France, no. Prague, Czech Republic; Oct. 15, 2008, XP050320678 [retrieved on Jun. 9, 2015], Section 5.5.1 and Section 5.5.4.

* cited by examiner

CONDITIONAL ACCESS TERMINAL INITIATION OF DELAYED HANDOVER

CLAIM OF PRIORITY

This application claims the benefit of and priority to commonly owned U.S. Provisional Patent Application No. 61/115,404, filed Nov. 17, 2008, and U.S. Provisional Patent Application No. 61/117,848, filed Nov. 25, 2008, the disclosure of each of which is hereby incorporated by reference herein.

CROSS-REFERENCE TO RELATED APPLICATION

This application is related to concurrently filed and commonly owned U.S. patent application Ser. No. 12/618,105, entitled "DECLARING RADIO LINK FAILURE BASED ON TARGET-SPECIFIC THRESHOLD," the disclosure of which is hereby incorporated by reference herein.

BACKGROUND

1. Field

This application relates generally to wireless communication and more specifically, but not exclusively, to improving access terminal mobility.

2. Introduction

A wireless communication network is deployed over a defined geographical area to provide various types of services (e.g., voice, data, multimedia services, etc.) to users within that geographical area. In a typical implementation, access points (e.g., corresponding to different cells or sectors) are distributed throughout a network to provide wireless connectivity for access terminals (e.g., cell phones) that are operating within the geographical area served by the network. In general, at a given point in time, the access terminal will be served by a given one of these access points. As the access terminal roams throughout this geographical area, the access terminal may move away from its serving access point and move closer to another access point. In this case, the access terminal may be handed-over from its serving access point to be served by the other access point to maintain mobility for the access terminal.

An example of how the serving access point for an access terminal may be changed follows. The access terminal may regularly perform radio frequency ("RF") measurements and determine that the signals being received from a neighbor access point (e.g., a so-called target access point) are stronger than the signals being received from the current serving access point by a certain margin. As a result, the access terminal sends a measurement report with this information to the network (e.g., to the serving access point). The serving access point then performs backhaul communication with the target access point to negotiate resources for the access terminal on the target access point. In addition, the serving access point sends a handover command to the access terminal, wherein the handover command identifies the resources assigned to the access terminal on the target access point. Finally, the access terminal connects to the target access point using these resources. A potential drawback of this handover procedure is that the target access point is not identified until the target access point is already stronger than the serving access point and, in some cases, the radio link with the serving access point may already be deteriorating at this point. In these cases, by the time the handover procedure starts, the signals from the serving access point may by too weak to be reliably received at the access terminal. Consequently, a radio link failure may occur whereby one or more of the above handover-related message may not be communicated between the access terminal and the serving access point.

In some cases, it may be determined that a particular neighbor access point is a source of mobility problems. For example, an excessively number of "late handovers" may occur in which an access terminal experiences radio link failure and attempts recovery on that neighbor access point before the source access point is able to prepare the neighbor access point. Such a situation may indicate that the neighbor access point is being measured as "too weak" relative to the serving access point. That is, the signals from the neighbor access point are not meeting measurement thresholds that would trigger the serving access point to prepare the neighbor access point for handover, or the signals are not meeting these thresholds until the access terminal is already experiencing radio conditions (relative to the serving access point) that are too poor for handoff mechanisms to work reliably. An access point could attempt to control this problem on a per-neighbor access point basis through the use of an access point-specific measurement threshold offset. However, the use of such an offset may not affect the access terminal's criteria for declaring radio link failure (e.g., initiating mobility towards a target access point).

SUMMARY

A summary of sample aspects of the disclosure follows. In the discussion herein, any reference to the term aspects may refer to one or more aspects of the disclosure.

The disclosure relates in some aspects to accounting for target-related conditions when deciding whether to declare a radio link failure. Here, an access terminal may use target-specific (e.g., cell-specific) thresholds to determine whether to declare a radio link failure. As one example, a decision to declare a radio link failure may be based on whether the received signal strength of a signal from a target access point meets or exceeds a threshold value (e.g., that is defined specifically for targets in general, that is defined for that specific target access point, or that is defined for a specified set of targets of which the target being measured is a member of the set). As another example, a decision to declare a radio link failure may be based on whether the received signal strength of a signal from a target access point meets or exceeds the received signal strength of a signal from a serving access point by a threshold value (e.g., that is defined for one or more target access points). Thus, in some aspects, an access terminal's detection of radio link failure may be at least partially contingent on whether a neighbor access point is "good enough" to serve as a target. Through the use of such a scheme, a handover to a target access point may be accomplished sooner than the handover would otherwise be accomplished using conventional handover procedures. Consequently, fewer handover-related failures may occur in a system that employs such a scheme.

The disclosure relates in some aspects to performing certain handover operations earlier than normal and then delaying the initiation of the handover so that certain handover messaging may be completed before there is a substantial deterioration in signaling conditions between an access terminal and its serving access point. Here, an access terminal may receive a message (e.g., a handover command) that includes a delayed handover indication or the access terminal may maintain a delayed handover indication (e.g., the access terminal is configured with the indication), where the indication indicates that the access terminal should delay initiating handover until a condition is met. For example, a serving access point may prepare target access points for handover when the received signal strengths at the access terminal of signals from these target access points are still relatively low (e.g., less than the signal strength of the signal from the serving access point). The serving access point may then send a handover command to the access terminal that instructs the access terminal to delay handover to one of these prepared target access points until a specified condition is met. Alternatively, the serving access point may send a standard handover command in cases where the access terminal has already been configured with the delayed handover indication. In some cases, the specified condition involves waiting for a signal from one of the target access points to become stronger. For example, the condition for the access terminal to initiate the delayed handover may involve waiting until the received signal strength of a signal from a target access point meets or exceeds a threshold value or waiting until the received signal strength of a signal from a target access point meets or exceeds the received signal strength of a signal from a serving access point by a threshold value. Through the use of such a scheme, a handover to a target access point may be accomplished sooner than the handover would otherwise be accomplished using conventional handover procedures. Consequently, fewer handover-related failures may occur in a system that employs such a scheme.

BRIEF DESCRIPTION OF THE DRAWINGS

These and other sample aspects of the disclosure will be described in the detailed description and the appended claims that follow, and in the accompanying drawings, wherein:

Figure 1:
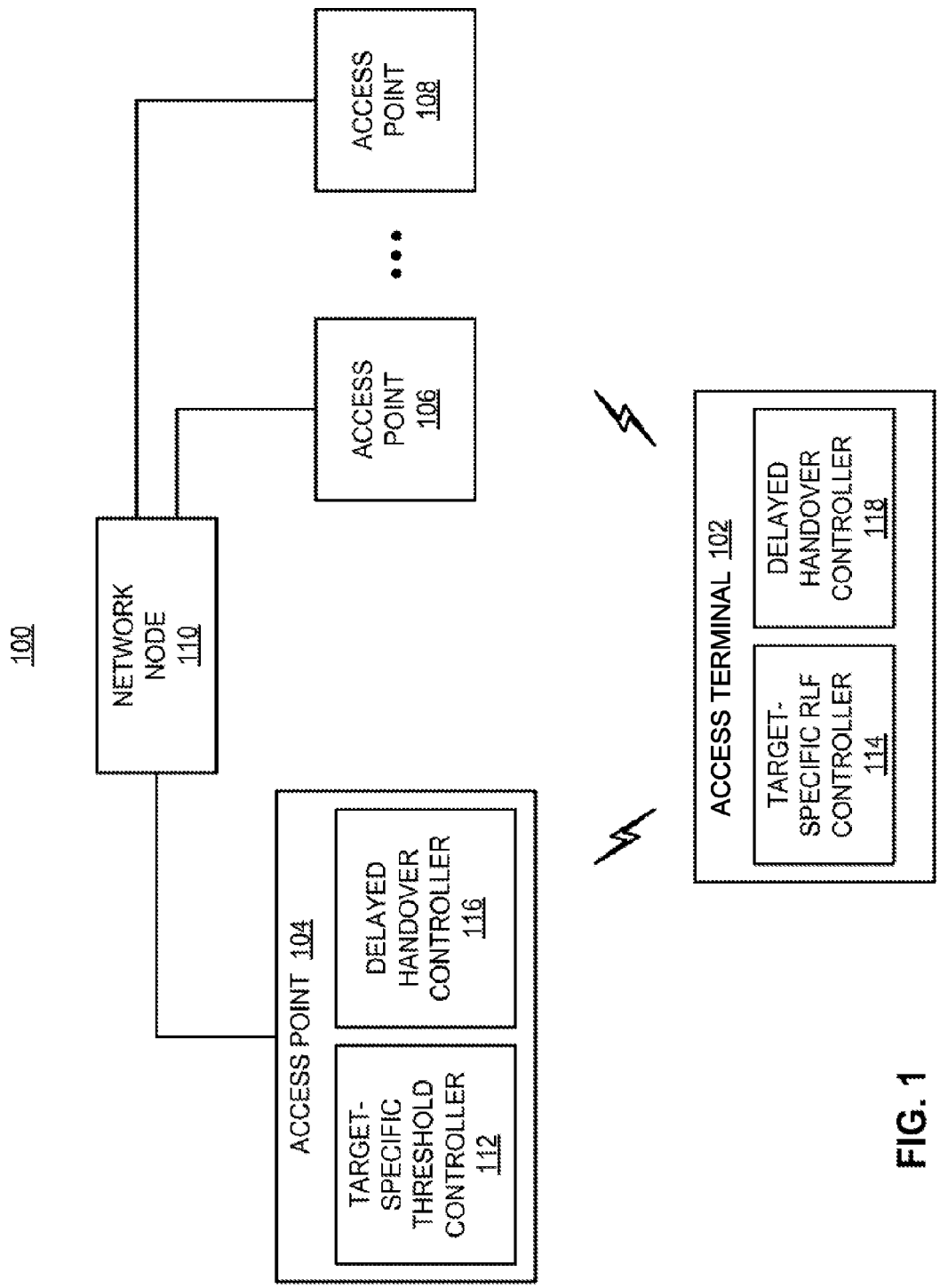
FIG. 1 is a simplified block diagram of several sample aspects of a communication system adapted to improve access terminal mobility.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, eNodeBs, cells, or sectors, while access terminals may be referred to or implemented as user equipment or mobile stations, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104 or any one of a set of neighbor access points 1-N (represented by access points 106 and 108 and the associated ellipsis). Each of the access points 104-108 may communicate with one or more network nodes (represented, for convenience, by network node 110) to facilitate wide area network connectivity. These network nodes may take various forms such as, for example, one or more radio and/or core network entities. Thus, in various implementations the network node 110 may represent functionality such as at least one of: network management (e.g., via an operation, administration, management, and provisioning entity), call control, session management, mobility management, gateway functions, interworking functions, or some other suitable network functionality.

As will be described in more detail below in conjunction with FIGS. 2 and 3, access terminals and access points in the system 100 may include functionality to enable an access terminal (e.g., access terminal 102) to determine whether to declare radio link failure (hereafter, RLF) based on conditions at a neighbor cell. For example, a decision to declare RLF may be based on whether a neighbor access point (e.g., access point 106) is a good candidate for being a target access point for a handover from the current serving access point (e.g., access point 104). To this end, access points in the system 100 may include target-specific threshold controller functionality 112 for providing one or more target-specific thresholds for their served access terminals. In addition, access terminals in the system 100 may include target-specific RLF controller functionality 114 that uses the target-specific threshold(s) for determining whether to declare RLF.

As will be described in more detail below in conjunction with FIG. 4, access terminals and access points in the system 100 may include functionality to perform certain handover operations earlier than normal and then delay the initiation of the handover until a defined condition is met. To this end, access points in the system 100 may include delayed handover controller functionality 116 for performing early target preparation and sending advance handover commands or other similar messages to their served access terminals. In addition, access terminals in the system 100 may include delayed handover controller functionality 118 that delays initiation of handover operations until a condition is met.

Figure 2A:
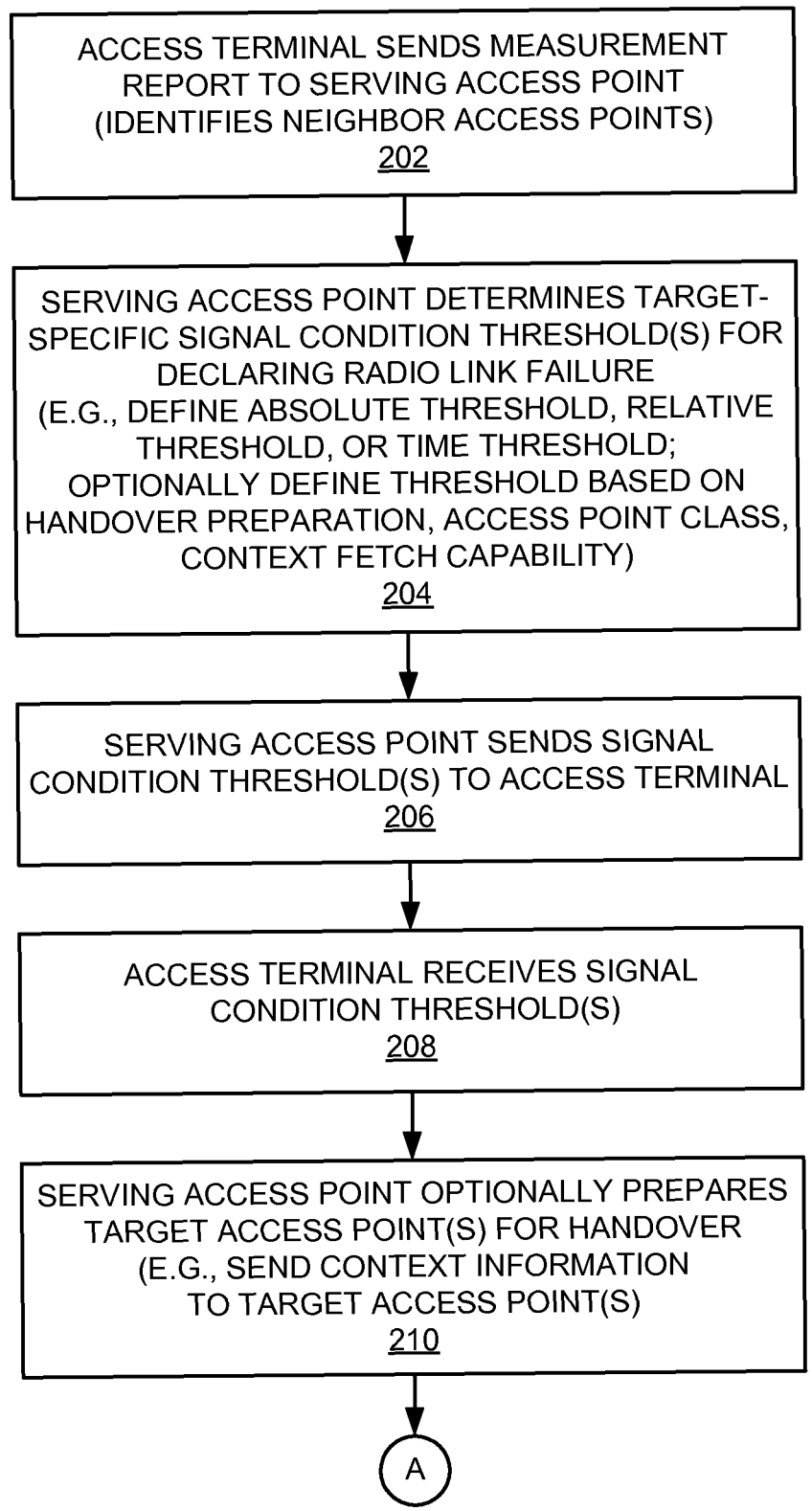
FIGS. 2A and 2B are a flowchart of several sample aspects of operations that may be performed to determine whether to declare RLF based on target-specific signal condition thresholds.
Figure 2B:
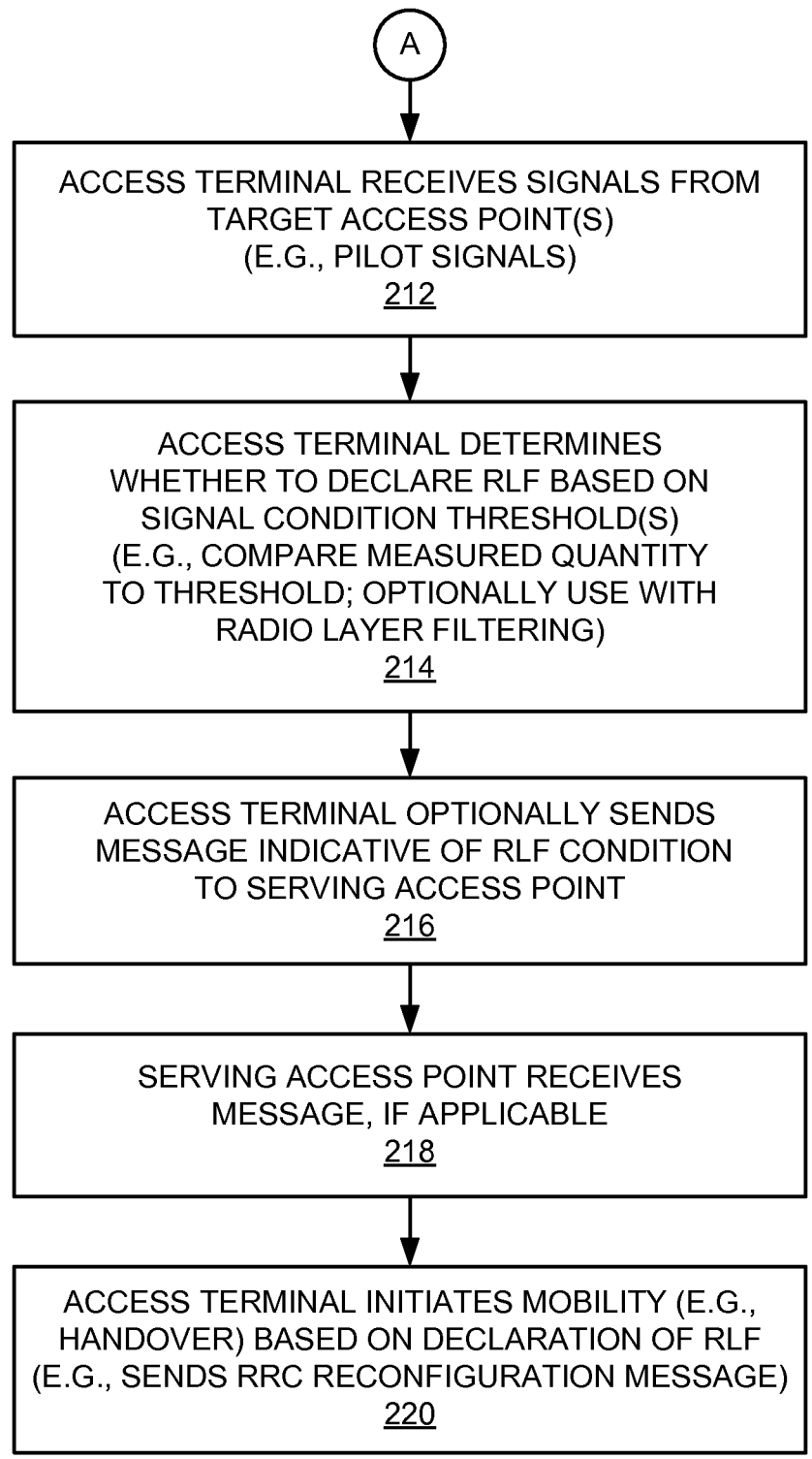

Referring initially to FIGS. 2A and 2B, this flowchart describes several sample operations that may be performed in conjunction with declaring radio link failure based on access point-specific signal condition thresholds. For convenience, the operations of FIG. 2 (or any other operations discussed or taught herein) may be described as being performed by specific components (e.g., components of the system 100). It should be appreciated, however, that these operations may be performed by other types of components and may be performed using a different number of components. It also should be appreciated that one or more of the operations described herein may not be employed in a given implementation.

As represented by block 202, an access terminal may regularly monitor for RF signals (e.g., pilot signals) from neighbor access points. In the event any of the received signals exceeds a defined reporting threshold, the access terminal sends a measurement report (e.g., a pilot strength measurement message) to its serving access point. This report includes an identifier of each access point that sent a signal that exceeded the reporting threshold and the signal strength of such a signal as received at the access terminal.

As represented by block 204, at some point in time the serving access point or some other suitable node (e.g., a network node) determines one or more target specific thresholds for declaring radio link failure. Here, one or more thresholds may be defined specifically for a given access point (e.g., a potential target), for a set of access points (e.g., a group of potential targets with similar handover properties, a group of potential targets that are operating on the same frequency, etc.), for a certain class of access points, or for all target access points. From the perspective of the access terminal, these access points are currently designated as non-serving access points (although, after handover of the access terminal, one of these access points may become a serving access point for the access terminal).

In some aspects, such a threshold may correspond to a signal condition (e.g., a measured quantity) associated with an access point. For example, a signal condition threshold may be defined to be compared with a measured quantity associated with a signal that an access terminal receives from an access point (e.g., a potential target). In some cases, a signal condition threshold may correspond to a relative measured quantity that is based on a difference between measured quantities. Such a threshold may be used, for example, to compare measured conditions associated with signals received from multiple access points. For example, a relative signal condition threshold may be compared to a difference between a first measured condition associated with a signal from a target access point and a second condition associated with a signal from a serving (or source) access point. A measure quantity may relate to a received signal strength, a signal-to-interference ratio, a time associated with a signal, or some other signal condition.

For example, in some cases a signal condition threshold may comprise a signal strength threshold. A received signal strength threshold may be compared to, for example, a received signal strength (e.g., absolute signal strength) of a signal from an access point as measured by an access terminal. Such a threshold may be used, for example, to make a decision based on the quality of a signal from a target access point, irrespective of the quality of signals from any other access point (e.g., a serving access point). In some aspects, a different signal strength threshold may be defined for different access points. For example, it may be desirable to handover to certain targets more quickly than other targets. In such a case, a signal strength threshold that is used to determine whether sufficient signal strength has been received from a target may be defined to be lower for some targets and higher for other targets.

In some cases, a signal condition threshold may comprise a relative signal strength threshold. A relative received signal strength threshold may be compared to, for example, a relative received signal strength value (e.g., a difference between a received signal strength of a signal from a target access point and a received signal strength of a signal from a serving access point). Such a threshold may be used, for example, to make a decision based on the relative quality of signals from different access points (e.g., a decision may be based on whether the target access point signal is 3 dB above the serving access point signal). In some aspects, a different relative signal strength threshold may be defined for different access points (e.g., to handover to certain targets more quickly than others). In such a case, a relative signal strength threshold that is used to determine whether a target access point is sufficiently stronger than a serving access point may be defined to be lower for some targets and higher for other targets.

In some cases, a signal condition threshold may comprise a time threshold. A time threshold may be compared to, for example, the duration of time that a signal (e.g., sent by a serving access point or target access point) satisfies a condition. Such a threshold may be used, for example, to make an RLF decision based on whether a particular signal condition (e.g., high signal strength) has existed for a defined period of time. In some aspects, a different time threshold may be defined for different access points (e.g., to handover to certain targets more quickly than others). In such a case, a time threshold that is used to determine whether sufficient signal strength has been received from a target for a period of time may be defined to be shorter for some targets and longer for other targets.

A signal condition threshold may be determined (e.g., defined) based on various criteria. Here, thresholds may be defined so that handovers to certain access points are conducted more aggressively than handovers to other access points. That is, the thresholds may be defined so that an access terminal will be handed-over to certain targets more quickly than other targets.

In some cases, a threshold is defined based on whether an access point has been prepared for handover. For example, a serving access point may define access point-specific thresholds such that handovers to access points that have been prepared are conducted more aggressively than handovers to access points that have not been prepared. This may be accomplished, for example, by specifying a lower signal strength threshold for the access points that have been prepared for handover.

In some cases, a threshold is defined based on a class associated with an access point. For example, a serving access point may define access point-specific thresholds such that handovers to access points of a given class (e.g., larger coverage access points such as macro access points) are conducted more aggressively than handovers to access points of a different class (e.g., smaller coverage access points such as femto access points). This may be accomplished, for example, by specifying a lower signal strength threshold for the access points of a given class.

In some cases, a threshold is defined based on whether an access point is able to fetch context information from a serving access point. Here, some access points in a network may be capable of forward handover whereby in the event the access point has not been prepared for handover before the access terminal arrives, the access point is able to fetch the appropriate context information for the handover from the serving (i.e., source) access point. In such a case, a serving access point may define access point-specific thresholds such that handovers to access points that are capable of performing a context fetch are conducted more aggressively than handovers to access points that are not capable of performing a context fetch. This may be accomplished, for example, by specifying a lower signal strength threshold for the access points that are capable of performing a context fetch.

A signal condition threshold may be determined by different nodes in a system in different implementations. In some implementations the serving access point may define the target specific signal threshold. For example, the serving access point may define a threshold based on information maintained or obtained (e.g., via reports from served access terminals) by the serving access point. In some implementations a network node may define a threshold based on information maintained or obtained (e.g., via reports from access points) by the network node. In these implementations, the serving access point may determine the threshold(s) to be sent to an access terminal by obtaining (e.g., requesting) the threshold information from the network node.

As represented by block 206, the serving access point sends the signal condition threshold(s) defined at block 204 to an access terminal. For example, for a given access terminal being served by a serving access point, the serving access point may send threshold information for every access point that was identified in a neighbor report supplied by that access terminal (e.g., at block 202), threshold information for some of these access points, threshold information for all targets generally, or some combination thereof. In some implementations, the serving access point sends the signal condition threshold to an access terminal as part of the configuration of the measurement subsystems.

As represented by block 208, an access terminal receives the threshold information sent by its serving access point. Thus, the access terminal may have a specific threshold to be used when analyzing signals from a specific one of the neighbor access points of that access terminal. Also, as discussed above, in some cases a given threshold may be applicable to a set of access points (e.g., a defined set or class) or to all targets generally.

As represented by block 210, the serving access point may prepare one or more access points for handover. For example, the serving access point may prepare every access point that was identified in a neighbor report supplied by the access terminal. Here, the serving access point (i.e., the source access point for the handover) may communicate with the target access point to reserve resources for the access terminal. For example, context information maintained by the serving access point may be sent to each target access point and/or resource information associated with a given target access point may be acquired by the serving access point.

As noted above, a signal condition threshold for an access point may be defined based on whether the access point has been prepared for handover. Thus, in such cases, the handover preparation operations of block 210 may be performed before the operations of block 204 described above.

As represented by block 212 of FIG. 2B, the access terminal receives signals from the target access points. For example, the access terminal may continuously or regularly monitor for pilot signals from its neighbor access points for measurement reporting as discussed above.

As represented by block 214, the access terminal may determine whether to declare RLF based on the signal condition threshold(s) received at block 208 and one or more received signals (e.g., as received at block 212). For example, for each target access point, the access terminal may compare an appropriate signal condition threshold (e.g., cell-specific, cell set-specific, or specific to all targets) with a measured quantity derived from a signal from that target access point. In some cases, the access terminal may declare RLF toward a given target access point. For example, the access terminal may declare RLF with the intention of being handed-over to a specific target access point (e.g., the target with the highest relative received signal strength). It may be seen that the access terminal may thus autonomously declare RLF. For example, the access terminal may determine whether RLF should be declared, as opposed to being instructed to declare RLF by some other node.

The type of threshold and the measured quantity used at block 214 corresponds to the thresholds and measured quantities described above at block 204. For example, the access terminal may declare RLF if the received signal strength for a given target access point exceeds a signal strength threshold. Thus, in some cases, the access terminal may declare RLF independent of the radio conditions in a serving cell (e.g., the RLF determination may be based solely on the radio conditions in a target cell). In addition, the access terminal may declare RLF if a relative received signal strength value for a given target access point exceeds a relative signal strength threshold, where the relative received signal strength value is obtained, for example, by calculating the difference between the received signal strengths for the target access point and the serving access point. Also, the access terminal may declare RLF if a measured time duration associated with a received signal from a given access point exceeds a time threshold, where the time duration is measured, for example, based on a received signal from an access point. For example, a time-based condition may involve determining whether the signal from a target access point is more than 3 dB above the signal from the serving access point for more than a defined period of time.

In some implementations, a signal condition threshold may be used in conjunction with filtering lower layer (e.g., radio layer) problem indications. For example, the manner in which a radio layer problem indication is treated (e.g., how aggressively handover is performed) may depend on whether the signal from a potential target exceeds a threshold. These aspects of the disclosure are described in more detail below in conjunction with FIG. 3.

In some implementations, an access terminal may notify its serving access point of its impending departure before abandoning the serving access point. For example, as represented by block 216, the access terminal may send a message indicative of the RLF condition to the serving access point. In some aspects, this message may explicitly indicate that RLF has been declared. Alternatively, this message may implicitly indicate the RLF condition by providing an indication of the conditions (e.g., received signal strength) that led to the declaration of RLF. The access terminal may send such information in a measurement report or some other suitable message. The notification message may then be received by the serving access point as represented by block 218.

As represented by block 220, the access terminal may initiate mobility (e.g., handover) based on the declaration of RLF. As discussed above, the declaration of RLF may be directed toward a specific target access point. Hence, the access terminal may attempt to reestablish a connection with that target access point. In some cases, the access terminal may select a target access point for connection reestablishment other than the target access point that caused RLF (e.g., the target that had a received signal strength higher than the signal condition threshold). For example, by the time the access terminal is ready to reestablish a connection, another target access point may have become stronger. In some implementations, re-establishing the connection may involve the access terminal sending a radio resource control (RRC) message (e.g., reconfiguration or connection reestablishment) to the target access point. Once the access terminal appears at the target access point and reestablishes its RRC connection at the target access point, the access terminal may commence exchanging data with the target access point. As discussed above, in some cases this may involve some handover related signaling between the source access point and the target access point. For example, the target access point may fetch context information from the source access point in cases where handover preparation did not occur before the RLF.

From the above, it may be seen that the access terminal may autonomously initiate mobility (e.g., handover) in some implementations. For example, the access terminal may determine whether to initiate a handover based on the RLF declaration, as opposed to handover being triggered by a command from a serving access point.

The teaching herein may be implemented in various ways. In some implementations, access terminal-initiated mobility is not tied to RLF. For example, access terminal-initiated mobility behavior may simply be in response to radio conditions. Thus, the neighbor access point-specific thresholds may represent criteria under which the access terminal is allowed to initiate mobility, as opposed to an approach for detecting radio link failure. Thus, in some aspects, such a scheme may involve an access terminal overriding its radio link failure detection procedure if the target access point meets the threshold value. Also, in some aspects, such a scheme may involve an access terminal considering the mobility as a forward handover without radio link failure.

As mentioned above, in some implementations the target access point and associated threshold are considered in the filtering of lower layer problem indications in determining whether RLF has occurred. FIG. 3 illustrates an example of such a scheme.

As represented by block 302, at some point in time one or more problem indications may be generated by a lower layer (e.g., radio layer) procedure of an access terminal due to, for example, deteriorating signal conditions in the current serving cell. Such problem indications may relate to, for example, loss of a signal from a serving access point, error rates above a threshold level, received signal strength below a certain level, signal-to-interference ratio below a certain level, and so on. Moreover, these problem indications may involve filtering to ensure that RLF is not declared due to, for example, transient (e.g., fast fading) conditions. For example, a given condition may be ignored unless the condition exists for a defined period of time.

Figure 3:
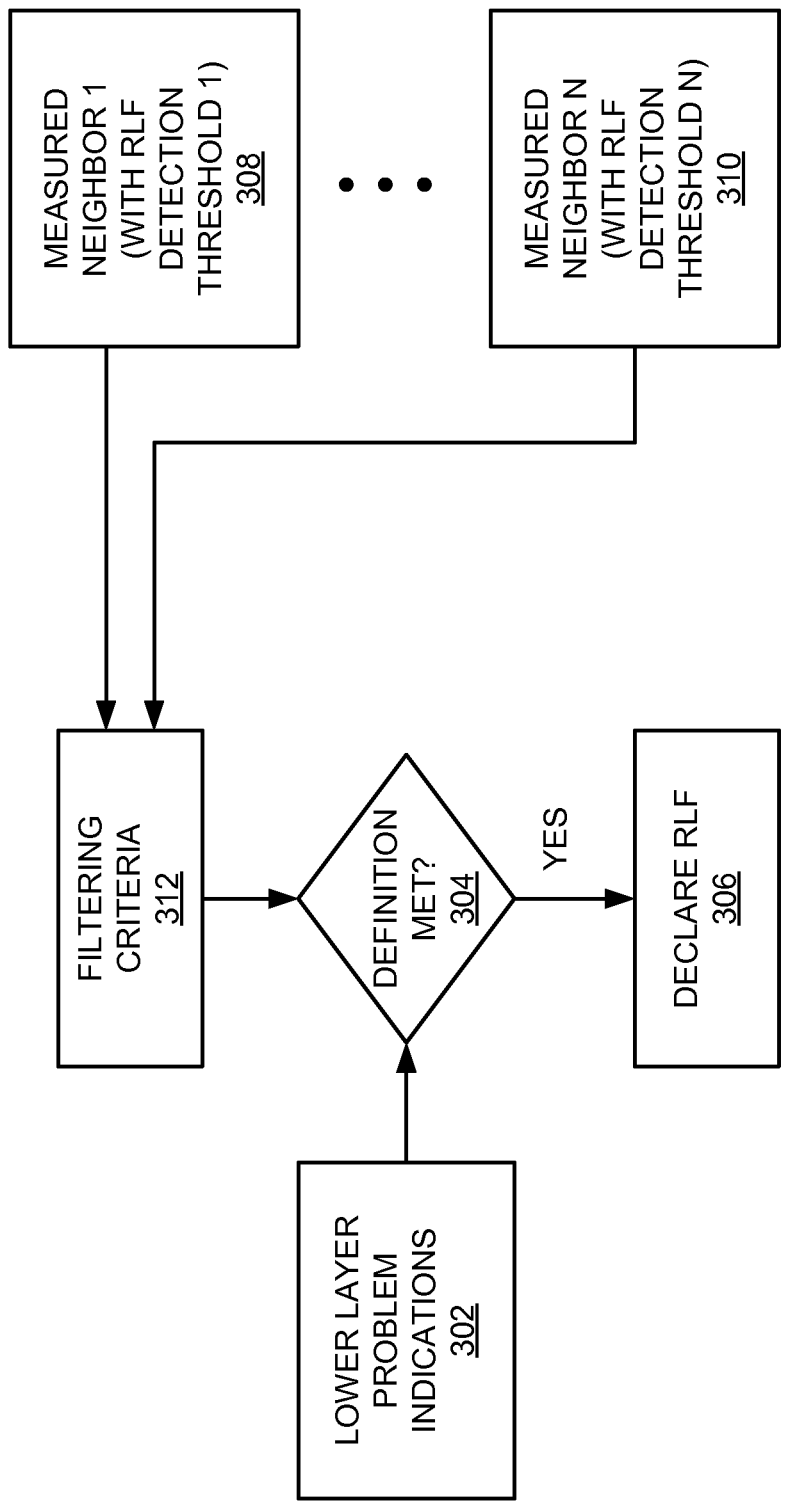
FIG. 3 is a simplified flow diagram illustrating several sample aspects of operations that may be performed to determine whether to declare RLF based on target-specific thresholds.

As shown in FIG. 3, the lower layer problem indications may comprise one input to an RLF decision block 304 that determines, for example, whether an RLF definition is met. If this definition is met, RLF is declared at block 306.

FIG. 3 also illustrates that target conditions may comprise another input to the RLF decision block 304. For example, as represented by blocks 308, 310, and 312, measured values associated with neighbor access points that may have corresponding RLF detection thresholds (e.g., signal condition thresholds) may be filtered based on filtering criteria (e.g., involving comparison of a measured value with a signal condition threshold as discussed herein) and taken into consideration when determining whether to declare RLF at block 304. Thus, in some aspects, the signal condition thresholds and the received signals from target access points may be used to filter lower layer problem indications (e.g., used to determine whether a particular lower layer problem indication should result in a declaration of RLF).

The interplay of lower layer problem indications and target-based conditions may take various forms. In some implementations, an indication of whether a good target access point has been identified (e.g., received signal strength above a threshold level), may result in an adjustment of the lower layer filtering. As an example, if a good target access point has been identified by the operations of blocks 308, 310, and 312, the access terminal may be more aggressive in declaring RLF in the presence of a lower layer problem indication. As a specific example, a time period used to determine whether a lower layer problem has existed long enough may be shortened if a good target access point has been identified. In this way, the access terminal may commence mobility sooner, rather than waiting to see if radio conditions in the serving cell improve.

Figure 4:
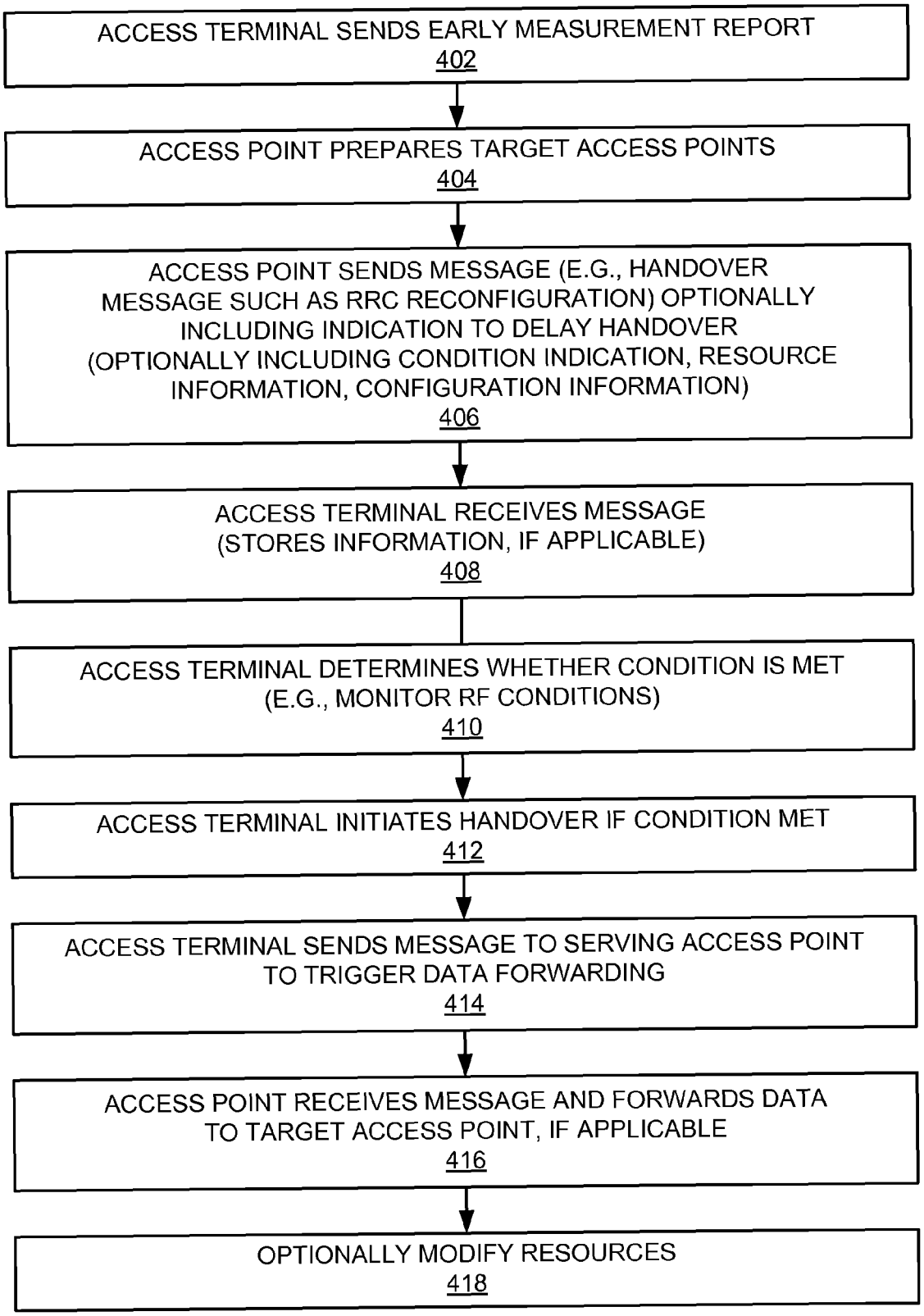
FIG. 4 is a flowchart of several sample aspects of operations that may be performed in conjunction with delaying a handover operation.

Referring now to FIG. 4, this flowchart describes a scheme that reduces the latency of performing a handover. Such a scheme may be particularly useful when signal conditions are rapidly changing, thereby making it undesirable to have to wait for messaging delays before handover can be executed. In some aspects, the describe scheme facilitates completing certain handover operations before there is a substantial deterioration in signaling conditions between an access terminal and its serving access point. Here, one or more handover operations are performed earlier than normal and an advance handover command is sent to the access terminal. However, the access terminal delays initiation of the handover until a defined condition is met (e.g., the target access point signal becomes stronger than the serving access point signal). In this way, delays that may otherwise be incurred in conjunction with handover operations that conventionally are performed following the identification of a target access point may be avoided. For example, operations relating to measurement reporting, sending a handover request to a target, receiving a handover request acknowledgment from the target, and sending a handover command to the access terminal may be performed before it is determined that the signal strength of a target meets a handover threshold. Thus, once it is determined that the signal strength of the target meets the handover threshold, the access terminal may immediately connect to the target. Consequently, the access terminal may be successfully handed-over to the target access point even if signal conditions at the serving access point have substantially deteriorated by this point in time.

As represented by block 402 of FIG. 4, measurement reporting thresholds may be configured such that an access terminal sends a measurement report when signals from a target access point are weaker than signals from the serving access point. This early measurement report may be accomplished, for example, through the use of an absolute threshold, a relative threshold (e.g., a relative offset from the serving access point signal strength), or some other suitable criterion.

As represented by block 404, the serving access point may determine whether any of the access points identified by the measurement report are good candidates for handover (e.g., those access points that are getting stronger from the perspective of the access terminal, but not yet stronger than the serving access point) and prepare these target access points for handover. Since the early measurement report may identify more than one candidate target access point, the serving access point may communicate over the backhaul with multiple target access points, and reserve resources for the access terminal on each of these target access points. As discussed above, this may involve sending context information and/or other information to each target access point.

As represented by block 406, the serving access point then sends a message (e.g., an advance handover command) to the access terminal. In some implementations, in addition to identifying one or more prepared access points, the message includes an indication to delay a handover operation until a condition is met. For example, a flag may be added to a handover command such that the access terminal will not process the command immediately if the flag is set to TRUE. In some implementations, the delayed handover indication may be provided to the access terminal in some other way. For example, the access terminal may have received the indication via a message that is not a handover message, the access terminal may have received the indication at some prior point in time (e.g., via another message), or the access terminal may have been configured with the indication in some other way (e.g., the access terminal may be pre-configured with the indication).

The above messages may take various forms. In some implementations such a message may take the form of an RRC reconfiguration message.

In some implementations, the serving access point also will provide information about the prepared target access points to the access terminal. For example, this information may relate to resources that are reserved for the access terminal at the various target access points and/or may relate to the configuration (system information) of the various target access points. In some implementations the serving access point will include this information in the message(s) sent at block 406 (e.g., handover message).

In addition, in some implementations a message sent at block 406 includes an indication of the condition that the access terminal is to use to determine when to initiate handover. In some cases, this indication may specify the condition that controls when the access terminal is to execute handover (e.g., whether the signal strength of a target is greater than or equal to a handover threshold). In some cases, this indication may specify that the access terminal is to specify the condition (e.g., the access terminal is to use an implementation dependent technique as maintained by the access terminal to decide when the handover is to be executed).

As represented by block 408, the access terminal receives the message sent at block 406. In the event handover is to be delayed (e.g., flag=TRUE), the access terminal may store the resource and configuration information included in the message for use during the delayed handover operation. Alternatively, if handover is not to be delayed (e.g., flag=FALSE), the access terminal may immediately connect to the target access point (e.g., via random access).

As represented by block 410, the access terminal then waits for the condition to be met (e.g., the access terminal waits for handover to become imminent). For example, the access terminal may continue to monitor RF conditions (e.g., pilot signals) associated with the target access points and/or the serving access point to determine when to initiate handover.

The delayed handover condition may take various forms. For example, in some cases this condition may be defined in terms of a signal strength differential between a serving access point and a target access point, in terms of a timer that tracks how long the target access point remains stronger than the serving access point, in terms of absolute signal strength levels at the target, or in terms of a signal-to-interference ratio. Accordingly, the condition may be based on criteria similar to the criteria discussed above at blocks 204 and 214 for determining whether to declare RLF.

Thus, in some aspects a delayed handover condition may correspond to a signal condition (e.g., a measured quantity) associated with an access point. For example, the condition may involve determining whether a measured quantity associated with a signal that an access terminal receives from an access point (e.g., a potential target) meets a specified criterion. In some cases, the condition may relate to a relative measured quantity that is based on a difference between measured quantities.

In some cases, a delayed handover condition may utilize a signal strength threshold. For example, the condition may involve determining whether a received signal strength (e.g., absolute signal strength) of a signal from a target access point is greater than or equal to a received signal strength threshold.

Also, a delayed handover condition may utilize a relative signal strength threshold in some cases. For example, the condition may involve determining whether a relative received signal strength value (e.g., a difference between a received signal strength of a signal from a target access point and a received signal strength of a signal from a serving access point) is greater than or equal to a relative received signal strength threshold.

In addition, a delayed handover condition may utilize a time threshold in some cases. For example, the condition may involve determining whether a specified condition (e.g., a particular signal condition such as high signal strength) is met for a defined period of time.

In some cases, a delayed handover condition relates to signal conditions for the serving access point (e.g., the received signal strength of a signal from the serving access point). For example, the condition may relate to whether the received signal strength of a signal from the serving access point is at or below a signal strength threshold (e.g., for a defined period of time or at any time). The condition also may relate to whether the received signal strength of a signal from the serving access point is at or below a first signal strength threshold (e.g., for a first defined period of time or at any time) and whether the received signal strength of a signal from a non-serving access point is at or above a second signal strength threshold (e.g., for a second defined period of time or at any time). In this case, the first and second thresholds may be different values or the same value. Similarly, the first and second time periods may be different values or the same value.

In some cases, a delayed handover condition may specify that the delayed handover operation is restricted to being initiated within a defined period of time after the handover message or some other specified message is received by the access terminal. For example, if some other handover initiation condition (e.g., based on received signal strength) is not met before this period of time expires, the access terminal will not proceed with the handover.

As mentioned above, the delayed handover condition or conditions to be used by the access terminal may be specified by the handover command or may be maintained by the access terminal. As an example of the latter case, the threshold values for verifying whether a condition is met may be stored in a data memory of the access terminal.

As represented by block 412, the access terminal initiates the handover if the condition is met (e.g., handover is imminent). Here, the access terminal may autonomously apply the stored configuration for the target access point and connect to the target access point (e.g., via random access). Advantageously, since the target access point has previously been prepared, the connection to the target access point may be achieved without the above described delays (e.g., associated with the handover messaging between the serving and target access points).

Moreover, from the above it may be seen that the access terminal may autonomously initiate mobility (e.g., handover). For example, the access terminal may determine when to initiate a handover based on the specified condition, as opposed to the handover timing being triggered by the receipt of a handover command from a serving access point.

As represented by block 414, in some implementations the access terminal may send a notification message to the serving access point that includes the identity of the target access point to which the access terminal is connecting. The serving access point may then use this notification to forward buffered data to the target access point. As a result, under some circumstances the target access point may have data ready to be sent to the access terminal by the time the access terminal connects to the target access point. The serving access point thus receives this message at block 416 and, in response to the receipt of this message, sends (e.g., forwards) buffered data to the target access point, if applicable.

As represented by block 418, in some situations the resources that have been assigned to an access terminal (e.g., at block 404) may be modified prior to initiation of the handover (e.g., at block 412). To account for this issue, the serving access point may at a later time send another message (e.g., RRC reconfiguration) that modifies the set of resources assigned to the access terminal by the target access point. The access terminal will therefore store this modified information and apply it when the handover is triggered. In some cases, the modified information may correspond to an updated quality of service (QoS) state of the access terminal. For example, if the access terminal initiates a voice call after it has received the first reconfiguration message, the serving access point and the target access point may communicate to set up new resources for the access terminal. These new resources may then be communicated to the access terminal. Alternatively, an RRC reconfiguration may be used to cancel the resources already allocated to the access terminal for a certain target access point. This may be done, for example, if the target access point is experiencing overloading.

Figure 5:
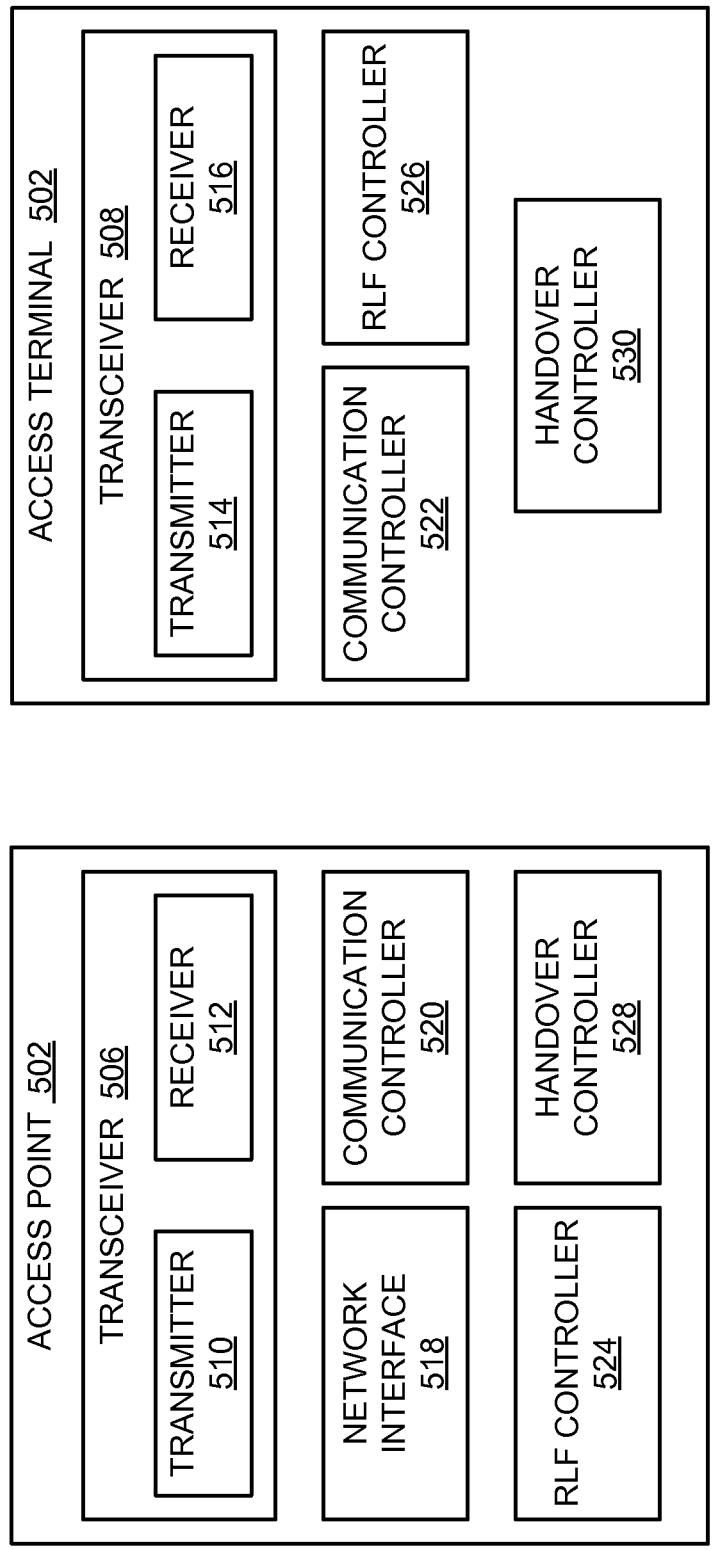
FIG. 5 is a simplified block diagram of several sample aspects of components that may be employed in communication nodes.

FIG. 5 illustrates several sample components that may be incorporated into nodes such as an access point 502 and an access terminal 504 (e.g., corresponding to access point 104 and access terminal 102, respectively) to perform mobility operations as taught herein. The described components also may be incorporated into other nodes in a communication system. For example, other nodes in a system may include components similar to those described for the access point 502 and the access terminal 504 to provide similar functionality. A given node may contain one or more of the described components. For example, an access terminal may contain multiple transceiver components that enable the access terminal to operate on multiple frequencies and/or communicate via different technologies.

As shown in FIG. 5, the access point 502 and the access terminal 504 may include transceivers 506 and 508 respectively, for communicating with other nodes. The transceiver 506 includes a transmitter 510 for sending signals (e.g., pilot signals, threshold information, handover messages, and other messages) and a receiver 512 for receiving signals (e.g., RLF indications, handover indication, and other messages). Similarly, the transceiver 508 includes a transmitter 514 for sending signals (e.g., RLF indications, handover indication, and other messages) and a receiver 516 for receiving signals (e.g., pilot signals, threshold information, handover messages, and other messages).

The access point 502 also includes a network interface 518 for communicating with other network nodes (e.g., sending/receiving handover-related messages to/from other access points). For example, the network interface 518 may be configured to communicate with one or more network nodes via a wired or wireless backhaul.

The access point 502 and the access terminal 504 also include other components that may be used in conjunction with mobility operations as taught herein. For example, the access point 502 and the access terminal 504 may include communication controllers 520 and 522, respectively, for managing communication with other nodes (e.g., sending and receiving messages/indications) and for providing other related functionality as taught herein. In addition, the access point 502 and the access terminal 504 may include RLF controllers 524 and 526 (e.g., corresponding in some aspects to controllers 112 and 114), respectively, for managing operations relating to declaring RLF and for providing other related functionality as taught herein. Also, the access point 502 and the access terminal 504 may include handover controllers 528 and 530 (e.g., corresponding in some aspects to controllers 116 and 118), respectively, for managing handover-related operations and for providing other related functionality as taught herein.

For convenience, the access point 502 and the access terminal 504 are shown in FIG. 5 as including components that may be used in the various examples described herein. In practice, one or more of the illustrated components may not be used in a given implementation. As an example, in some implementations the access point 502 may not comprise the RLF controller 524 and the access terminal 504 may not include the RLF controller 526.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 6:
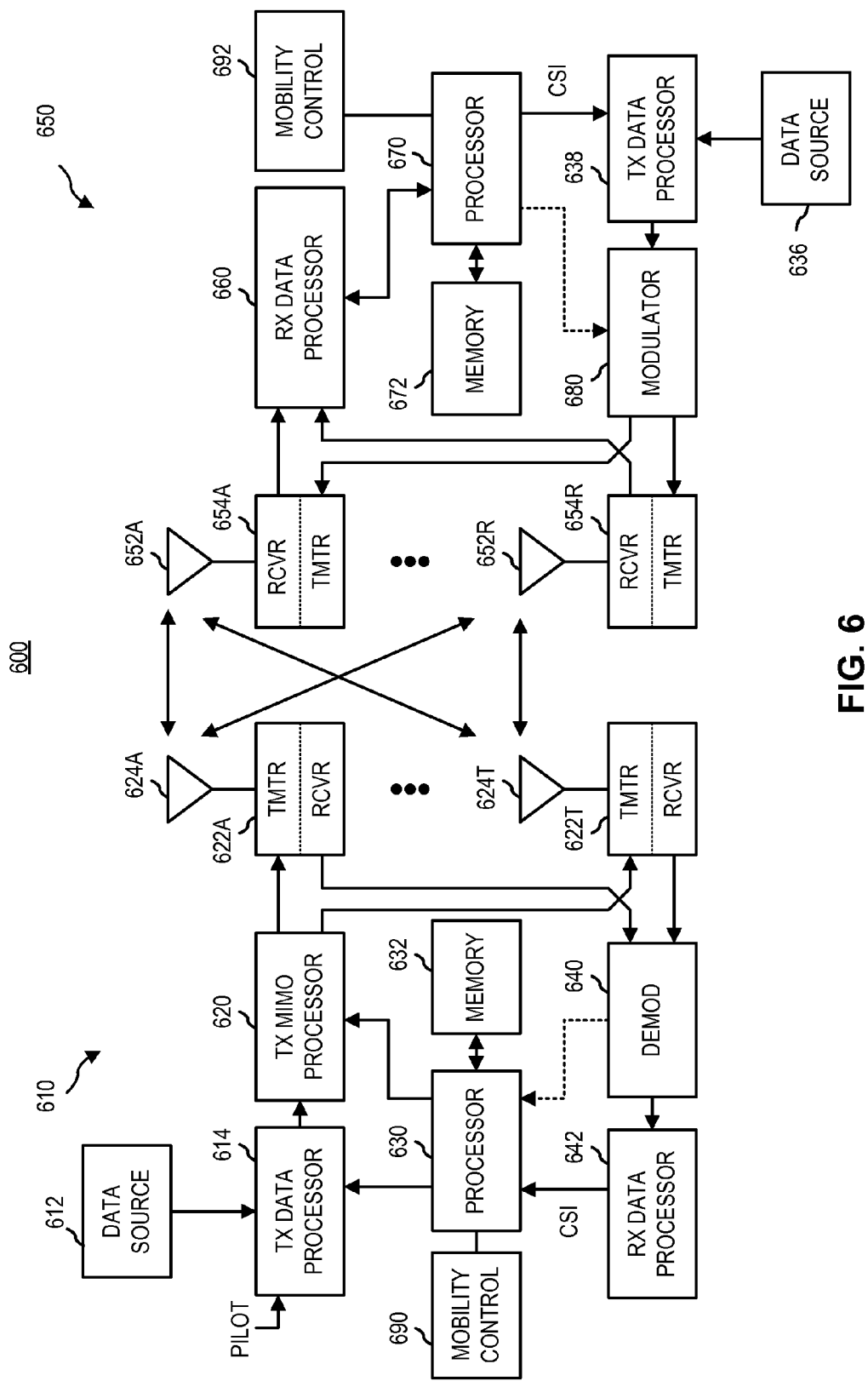
FIG. 6 is a simplified block diagram of several sample aspects of communication components.
Figure 7:
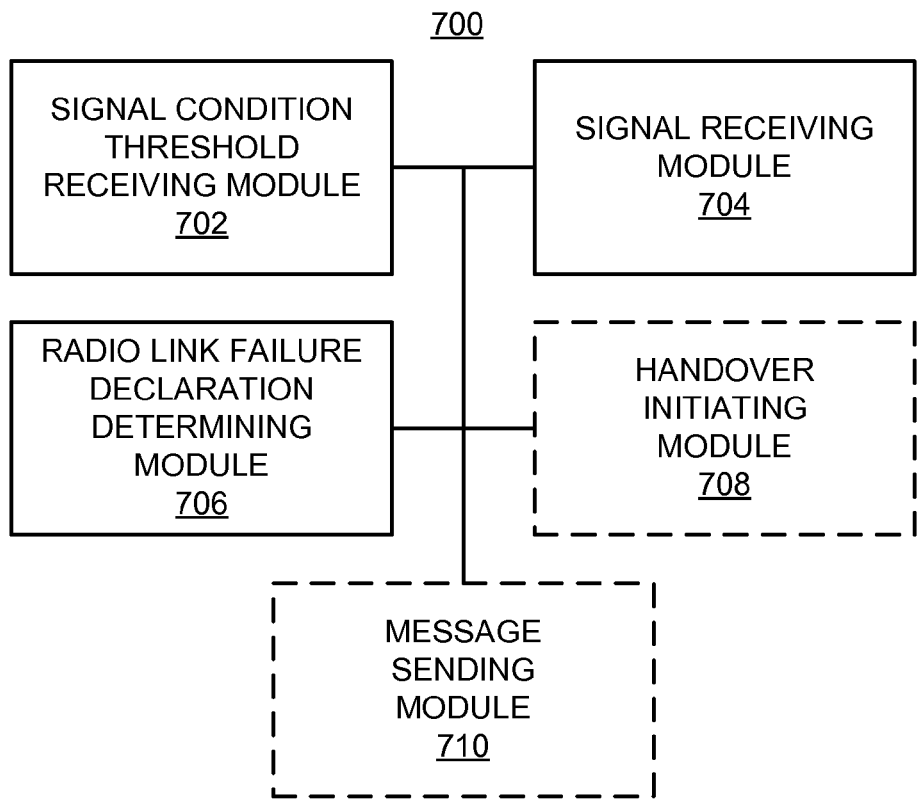
FIGS. 7-10 are simplified block diagrams of several sample aspects of apparatuses configured to mitigate handover-related failures as taught herein.
Figure 8:
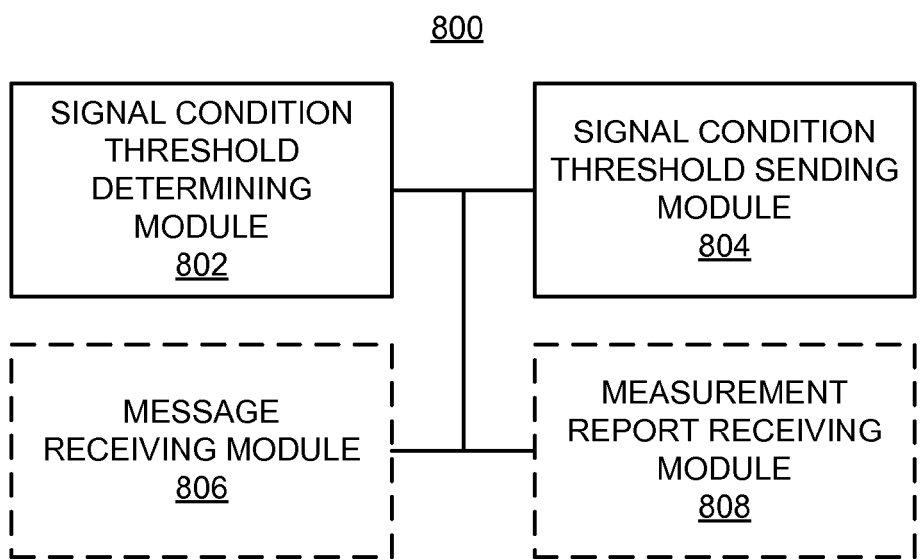
Figure 9:
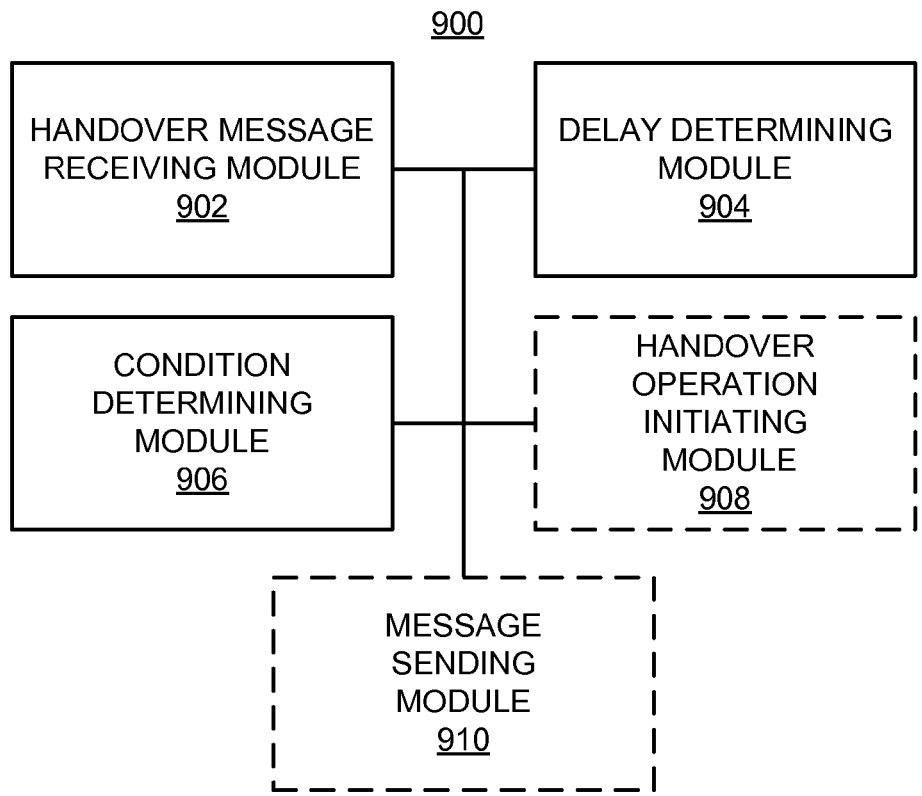
Figure 10:
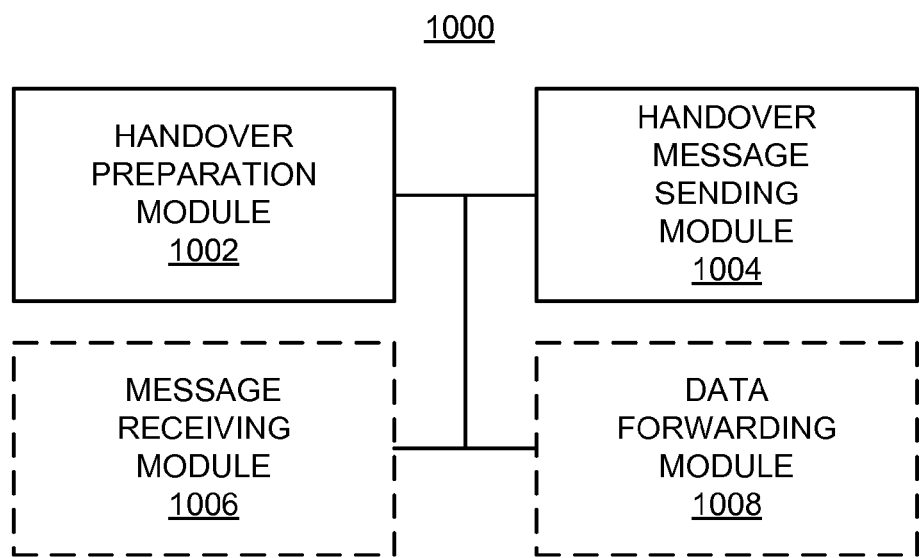

FIG. 6 illustrates a wireless device 610 (e.g., an access point) and a wireless device 650 (e.g., an access terminal) of a sample MIMO system 600. At the device 610, traffic data for a number of data streams is provided from a data source 612 to a transmit (TX) data processor 614. Each data stream may then be transmitted over a respective transmit antenna.

The TX data processor 614 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 630. A data memory 632 may store program code, data, and other information used by the processor 630 or other components of the device 610.

The modulation symbols for all data streams are then provided to a TX MIMO processor 620, which may further process the modulation symbols (e.g., for OFDM). The TX MIMO processor 620 then provides $N_T$ modulation symbol streams to $N_T$ transceivers (XCVR) 622A through 622T. In some aspects, the TX MIMO processor 620 applies beam-forming weights to the symbols of the data streams and to the antenna from which the symbol is being transmitted.

Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 622A through 622T are then transmitted from $N_T$ antennas 624A through 624T, respectively.

At the device 650, the transmitted modulated signals are received by $N_R$ antennas 652A through 652R and the received signal from each antenna 652 is provided to a respective transceiver (XCVR) 654A through 654R. Each transceiver 654 conditions (e.g., filters, amplifies, and downconverts) a respective received signal, digitizes the conditioned signal to provide samples, and further processes the samples to provide a corresponding "received" symbol stream.

A receive (RX) data processor 660 then receives and processes the $N_R$ received symbol streams from $N_R$ transceivers 654 based on a particular receiver processing technique to provide $N_T$ "detected" symbol streams. The RX data processor 660 then demodulates, deinterleaves, and decodes each detected symbol stream to recover the traffic data for the data stream. The processing by the RX data processor 660 is complementary to that performed by the TX MIMO processor 620 and the TX data processor 614 at the device 610.

A processor 670 periodically determines which pre-coding matrix to use (discussed below). The processor 670 formulates a reverse link message comprising a matrix index portion and a rank value portion. A data memory 672 may store program code, data, and other information used by the processor 670 or other components of the device 650.

The reverse link message may comprise various types of information regarding the communication link and/or the received data stream. The reverse link message is then processed by a TX data processor 638, which also receives traffic data for a number of data streams from a data source 636, modulated by a modulator 680, conditioned by the transceivers 654A through 654R, and transmitted back to the device 610.

At the device 610, the modulated signals from the device 650 are received by the antennas 624, conditioned by the transceivers 622, demodulated by a demodulator (DEMOD) 640, and processed by a RX data processor 642 to extract the reverse link message transmitted by the device 650. The processor 630 then determines which pre-coding matrix to use for determining the beam-forming weights then processes the extracted message.

FIG. 6 also illustrates that the communication components may include one or more components that perform mobility operations as taught herein. For example, a mobility control component 690 may cooperate with the processor 630 and/or other components of the device 610 to send/receive signals to/from another device (e.g., device 650) as taught herein. Similarly, a mobility control component 692 may cooperate with the processor 670 and/or other components of the device 650 to send/receive signals to/from another device (e.g., device 610). It should be appreciated that for each device 610 and 650 the functionality of two or more of the described components may be provided by a single component. For example, a single processing component may provide the functionality of the mobility control component 690 and the processor 630 and a single processing component may provide the functionality of the mobility control component 692 and the processor 670. In some implementations, the processor 630 and the memory 632 may collectively provide mobility-related and other functionality as taught herein for the device 610, and the processor 670 and the memory 672 may collectively provide mobility-related and other functionality as taught herein for the device 650.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 7-10, apparatuses 700, 800, 900, and 1000 are represented as a series of interrelated functional modules. Here, a signal condition threshold receiving module 702, a radio link failure declaration determining module 708, and a message sending module 710 may correspond at least in some aspects to, for example, an RLF controller (e.g., RLF controller 526) as discussed herein. A signal receiving module 704 and a handover message receiving module 902 may correspond at least in some aspects to, for example, a communication controller (e.g., controller 522) as discussed herein. A handover initiating module 708, a delay determining module 904, a condition determining module 906, a handover operation initiating module 908, and a message sending module 910 may correspond at least in some aspects to, for example, a handover controller (e.g., controller 530) as discussed herein. A signal condition threshold determining module 802 and a message receiving module 806 may correspond at least in some aspects to, for example, an RLF controller (e.g., RLF controller 524) as discussed herein. A signal condition threshold sending module 804, a measurement report receiving module 808, a handover message sending module 1004, and a message receiving module 1006 may correspond at least in some aspects to, for example, a communication controller (e.g., controller 520) as discussed herein. A handover preparation module 1002 and a data forwarding module 1008 may correspond at least in some aspects to, for example, a handover controller (e.g., controller 528) as discussed herein.

The functionality of the modules of FIGS. 7-10 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 7-10 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
receiving a handover message at an access terminal, wherein the handover message identifies a plurality of access points that have been prepared for handover, and wherein the handover message comprises configuration information for the plurality of access points that have been prepared for handover;
receiving, prior to a determination of signal conditions indicating handover of the access terminal, an advance handover command from a serving access point instructing the access terminal to perform a conditional handover operation associated with the received handover message upon occurrence of a handover condition, wherein the handover condition relates to whether a serving access point received signal strength is less than or equal to a first signal strength threshold for a first defined period of time and whether a received signal strength of a signal received from one or more of the plurality of access points that have been prepared for handover is greater than or equal to a second signal strength threshold for a second defined period of time;
determining whether the handover condition has occurred; and
executing, by the access terminal, the conditional handover operation upon occurrence of the handover condition for an access point selected from the plurality of access points that have been prepared for handover by connecting, autonomously from the serving access point based on the advance handover command, to the selected access point according to the configuration information.

2. The method of claim 1, wherein the handover message comprises the advance handover command.

3. The method of claim 1, wherein:
the handover condition further relates to whether a relative received signal strength value is greater than or equal to a relative received signal strength threshold; and
the relative received signal strength value is based on the received signal strength of the signal received from the selected access point and the serving access point received signal strength.

4. The method of claim 1, wherein the handover condition further relates to whether a specified condition is met for a period of time.

5. The method of claim 1, wherein the handover condition specifies that the conditional handover operation is restricted to being initiated within a defined period of time after the handover message is received, and wherein, upon expiration of the defined period of time, the access terminal does not proceed with the conditional handover operation.

6. The method of claim 1, wherein the handover message further comprises an indication of the handover condition.

7. The method of claim 6, wherein the indication of the handover condition specifies the handover condition.

8. The method of claim 6, wherein the indication of the handover condition specifies that the access terminal is to specify the handover condition.

9. The method of claim 1, further comprising sending a message to the serving access point to trigger the serving access point to forward data to a target access point, wherein the message comprises an identifier of the target access point.

10. The method of claim 1, wherein the handover message is a radio resource control reconfiguration message.

11. The method of claim 1, wherein:
the handover message further comprises resource information relating to resources reserved for the access terminal for the conditional handover operation; and
the access terminal stores the resource information and the configuration information for use during the conditional handover operation.

12. The method of claim 1, wherein the determining whether the handover condition has occurred comprises determining whether the handover condition has occurred irrespective of whether signaling conditions between the access terminal and the serving access point have substantially deteriorated.

13. An apparatus for communication, comprising:
a communication controller configured to receive a handover message at an access terminal, wherein the handover message identifies a plurality of access points that have been prepared for handover, and wherein the handover message comprises configuration information for the plurality of access points that have been prepared for handover; and
a handover controller at the access terminal configured to:
receive, prior to a determination of signal conditions indicating handover of the access terminal, an advance handover command from a serving access point instructing the access terminal to perform a conditional handover operation associated with the received handover message upon occurrence of a handover condition, wherein the handover condition relates to whether a serving access point received signal strength is less than or equal to a first signal strength threshold for a first defined period of time and whether a received signal strength of a signal received from one or more of the plurality of access points that have been prepared for handover is greater than or equal to a second signal strength threshold for a second defined period of time;
determine whether the handover condition has occurred; and
execute the conditional handover operation upon occurrence of the handover condition for an access point selected from the plurality of access points that have been prepared for handover by connecting, autonomously from the serving access point based on the advance handover command, to the selected access point according to the configuration information.

14. The apparatus of claim 13, wherein:
the handover condition further relates to whether a relative received signal strength value is greater than or equal to a relative received signal strength threshold; and
the relative received signal strength value is based on the received signal strength of the signal received from the selected access point and the serving access point received signal strength.

15. The apparatus of claim 13, wherein the handover message further comprises an indication of the handover condition.

16. The apparatus of claim 13, wherein the handover controller is configured to determine whether the handover condition has occurred irrespective of whether signaling conditions between the access terminal and the serving access point have substantially deteriorated.

17. An apparatus for communication, comprising:
means for receiving a handover message at an access terminal, wherein the handover message identifies a plurality of access points that have been prepared for handover, and wherein the handover message comprises configuration information for the plurality of access points that have been prepared for handover;
means for receiving, prior to a determination of signal conditions indicating handover of the access terminal, an advance handover command from a serving access point instructing the access terminal to perform a conditional handover operation associated with the received handover message upon occurrence of a handover condition, wherein the handover condition relates to whether a serving access point received signal strength is less than or equal to a first signal strength threshold for a first defined period of time and whether a received signal strength of a signal received from one or more of the plurality of access points that have been prepared for handover is greater than or equal to a second signal strength threshold for a second defined period of time;
means for determining whether the handover condition has occurred; and
means for executing, by the access terminal, the conditional handover operation upon occurrence of the handover condition for an access point selected from the plurality of access points that have been prepared for handover by connecting, autonomously from the serving access point based on the advance handover command, to the selected access point according to the configuration information.

18. The apparatus of claim 17, wherein:
the handover condition further relates to whether a relative received signal strength value is greater than or equal to a relative received signal strength threshold; and
the relative received signal strength value is based on the received signal strength of the signal received from the selected access point and the serving access point received signal strength.

19. The apparatus of claim 17, wherein the handover message further comprises an indication of the handover condition.

20. The apparatus of claim 17, wherein the means for determining whether the handover condition has occurred comprises means for determining whether the handover condition has occurred irrespective of whether signaling conditions between the access terminal and the serving access point have substantially deteriorated.

21. A computer-program product, comprising:
a non-transitory computer-readable medium comprising code for causing a computer to:
receive a handover message at an access terminal, wherein the handover message identifies a plurality of access points that have been prepared for handover, and wherein the handover message comprises configuration information for the plurality of access points that have been prepared for handover;
receive, prior to a determination of signal conditions indicating handover of the access terminal, an advance handover command from a serving access point instructing the access terminal to perform a conditional handover operation associated with the received handover message upon occurrence of a handover condition, wherein the handover condition relates to whether a serving access point received signal strength is less than or equal to a first signal strength threshold for a first defined period of time and whether a received signal strength of a signal received from one or more of the plurality of access points that have been prepared for handover is greater than or equal to a second signal strength threshold for a second defined period of time;
determine whether the handover condition has occurred; and
execute, by the access terminal, the conditional handover operation upon occurrence of the handover condition for an access point selected from the plurality of access points that have been prepared for handover by connecting, autonomously from the serving access point based on the advance handover command, to the selected access point according to the configuration information.

22. The computer-program product of claim 21, wherein:
the handover condition further relates to whether a relative received signal strength value is greater than or equal to a relative received signal strength threshold; and
the relative received signal strength value is based on the received signal strength of the signal received from the selected access point and the serving access point received signal strength.

23. The computer-program product of claim 21, wherein the handover message further comprises an indication of the handover condition.

24. The computer program product of claim 21, wherein the computer-readable medium further comprises code for causing the computer to determine whether the handover condition has occurred irrespective of whether signaling conditions between the access terminal and the serving access point have substantially deteriorated.

25. A method of communication, comprising:
sending, prior to a determination of signal conditions indicating handover of an access terminal from a serving access point, at least one message to prepare a plurality of access points for handover of the access terminal; and
sending a handover message to the access terminal, wherein the handover message identifies the plurality of access points and comprises configuration information for the plurality of access points, and wherein the handover message comprises an advance handover command instructing the access terminal to perform a conditional handover operation upon occurrence of a handover condition, wherein the handover condition relates to whether a serving access point received signal strength is less than or equal to a first signal strength threshold for a first defined period of time and whether a received signal strength of a signal received from one or more of the plurality of access points prepared for handover is greater than or equal to a second signal strength threshold for a second defined period of time, and wherein the instructions to perform the conditional handover operation comprise instructions to execute the conditional handover operation upon occurrence of the handover condition for an access point selected from the plurality of access points that have been prepared for handover by autonomously connecting to the selected access point according to the configuration information.

26. The method of claim 25, wherein the handover condition further relates to whether the received signal strength of the signal received from the selected access point exceeds the serving access point received signal strength.

27. The method of claim 25, wherein:
the handover condition relates to whether a relative received signal strength value is greater than or equal to a relative received signal strength threshold; and
the relative received signal strength value is based on the received signal strength of the signal received from the selected access point and the serving access point received signal strength.

28. The method of claim 25, wherein the handover condition specifies that the conditional handover operation is restricted to being initiated within a defined period of time after the handover message is received by the access terminal.

29. The method of claim 25, wherein the handover message further comprises an indication of the handover condition.

30. The method of claim 29, wherein the indication of the handover condition specifies the handover condition.

31. The method of claim 29, wherein the indication of the handover condition specifies that the access terminal is to specify the handover condition.

32. The method of claim 25, further comprising:
receiving a message from the access point, wherein the message comprises an identifier of a target access point selected from the plurality of access points; and
forwarding data to the target access point as a result of the receipt of the message.

33. The method of claim 25, wherein the handover message is a radio resource control reconfiguration message.

34. The method of claim 25, wherein the handover message further comprises resource information relating to resources reserved for the access terminal for the conditional handover operation.

35. An apparatus for communication, comprising:
a handover controller configured to send, prior to a determination of signal conditions indicating handover of an access terminal from a serving access point, at least one message to prepare a plurality of access points for handover of the access terminal; and
a communication controller configured to send a handover message to the access terminal, wherein the handover message identifies the plurality of access points and comprises configuration information for the plurality of access points, and wherein the handover message comprises an advance handover command instructing the access terminal to perform a conditional handover operation upon occurrence of a handover condition, wherein the handover condition relates to whether a serving access point received signal strength is less than or equal to a first signal strength threshold for a first defined period of time and whether a received signal strength of a signal received from one or more of the plurality of access points prepared for handover is greater than or equal to a second signal strength threshold for a second defined period of time, and wherein the instructions to perform the conditional handover operation comprise instructions to execute the conditional handover operation upon occurrence of the handover condition for an access point selected from the plurality of access points that have been prepared for handover by autonomously connecting to the selected access point according to the configuration information.

36. The apparatus of claim 35, wherein:
the handover condition relates to whether a relative received signal strength value is greater than or equal to a relative received signal strength threshold; and
the relative received signal strength value is based on the received signal strength of the signal received from the selected access point and the serving access point received signal strength.

37. The apparatus of claim 35, wherein:
the communication controller is further configured to receive a message from the access terminal, wherein the message comprises an identifier of a target access point selected from the plurality of access points; and
the handover controller is further configured to forward data to the target access point as a result of the receipt of the message.

38. An apparatus for communication, comprising:
means for sending, prior to a determination of signal conditions indicating handover of an access terminal from a serving access point, at least one message to prepare a plurality of access points for handover of the access terminal; and
means for sending a handover message to the access terminal, wherein the handover message identifies the plurality of access points and comprises configuration information for the plurality of access points, and wherein the handover message comprises an advance handover command instructing the access terminal to perform a conditional handover operation upon occurrence of a handover condition, wherein the handover condition relates to whether a serving access point received signal strength is less than or equal to a first signal strength threshold for a first defined period of time and whether a received signal strength of a signal received from one or more of the plurality of access points prepared for handover is greater than or equal to a second signal strength threshold for a second defined period of time, and wherein the instructions to perform the conditional handover operation comprise instructions to execute the conditional handover operation upon occurrence of the handover condition for an access point selected from the plurality of access points that have been prepared for handover by autonomously connecting to the selected access point according to the configuration information.

39. The apparatus of claim 38, wherein:
the handover condition relates to whether a relative received signal strength value is greater than or equal to a relative received signal strength threshold; and
the relative received signal strength value is based on the received signal strength of the signal received from the access point of the selected access point and the serving access point received signal strength.

40. The apparatus of claim 38, further comprising:
means for receiving a message from the access terminal, wherein the message comprises an identifier of a target access point selected from the plurality of access points; and
means for forwarding data to the target access point as a result of the receipt of the message.

41. A computer-program product, comprising:
a non-transitory computer-readable medium comprising code for causing a computer to:
send, prior to a determination of signal conditions indicating handover of an access terminal from a serving access point, at least one message to prepare a plurality of access points for handover of the access terminal; and
send a handover message to the access terminal, wherein the handover message identifies the plurality of access points and comprises configuration information for the plurality of access points, and wherein the handover message comprises an advance handover command instructing the access terminal to perform a conditional handover operation upon occurrence of a handover condition, wherein the handover condition relates to whether a serving access point received signal strength is less than or equal to a first signal strength threshold for a first defined period of time and whether a received signal strength of a signal received from one or more of the plurality of access points prepared for handover is greater than or equal to a second signal strength threshold for a second defined period of time, and wherein the instructions to perform the conditional handover operation comprise instructions to execute the conditional handover operation upon occurrence of the handover condition for an access point selected from the plurality of access points that have been prepared for handover by autonomously connecting to the selected access point according to the configuration information.

42. The computer-program product of claim 41, wherein:
the handover condition relates to whether a relative received signal strength value is greater than or equal to a relative received signal strength threshold; and
the relative received signal strength value is based on the received signal strength of the signal received from the selected access point and the serving access point received signal strength.

43. The computer-program product of claim 41, wherein the computer-readable medium further comprises code for causing the computer to:
receive a message from the access terminal, wherein the message comprises an identifier of a target access point selected from the plurality of access points; and
forward data to the target access point as a result of the receipt of the message.

* * * * *